Figure 1:
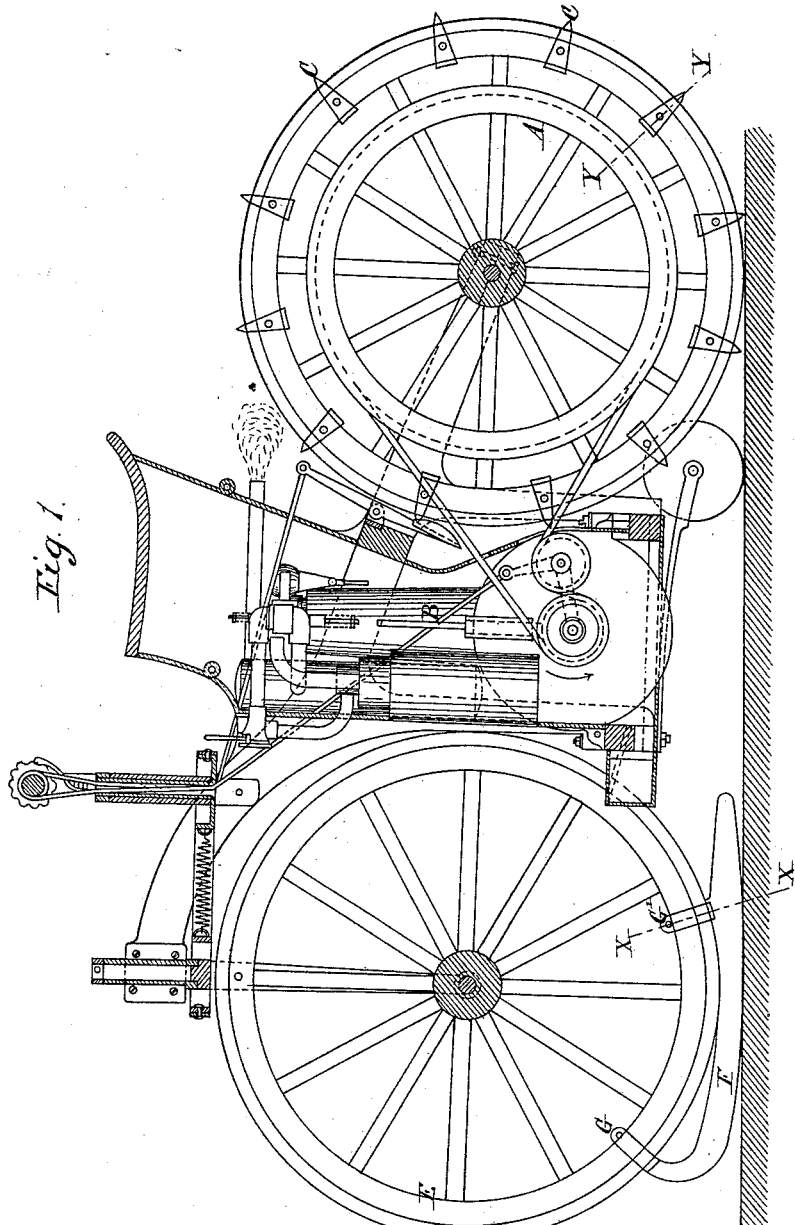

(No Model.) 2 Sheets—Sheet 1.

G. DAIMLER.
POWER DRIVEN VEHICLE.

No. 347,160. Patented Aug. 10, 1886.

Witnesses:
Percy B. Stills.
Robert Everett.

Inventor,
Gottlieb Daimler
By James L. Norris.
Atty.

(No Model.) 2 Sheets—Sheet 2.
G. DAIMLER.
POWER DRIVEN VEHICLE.
No. 347,160. Patented Aug. 10, 1886.
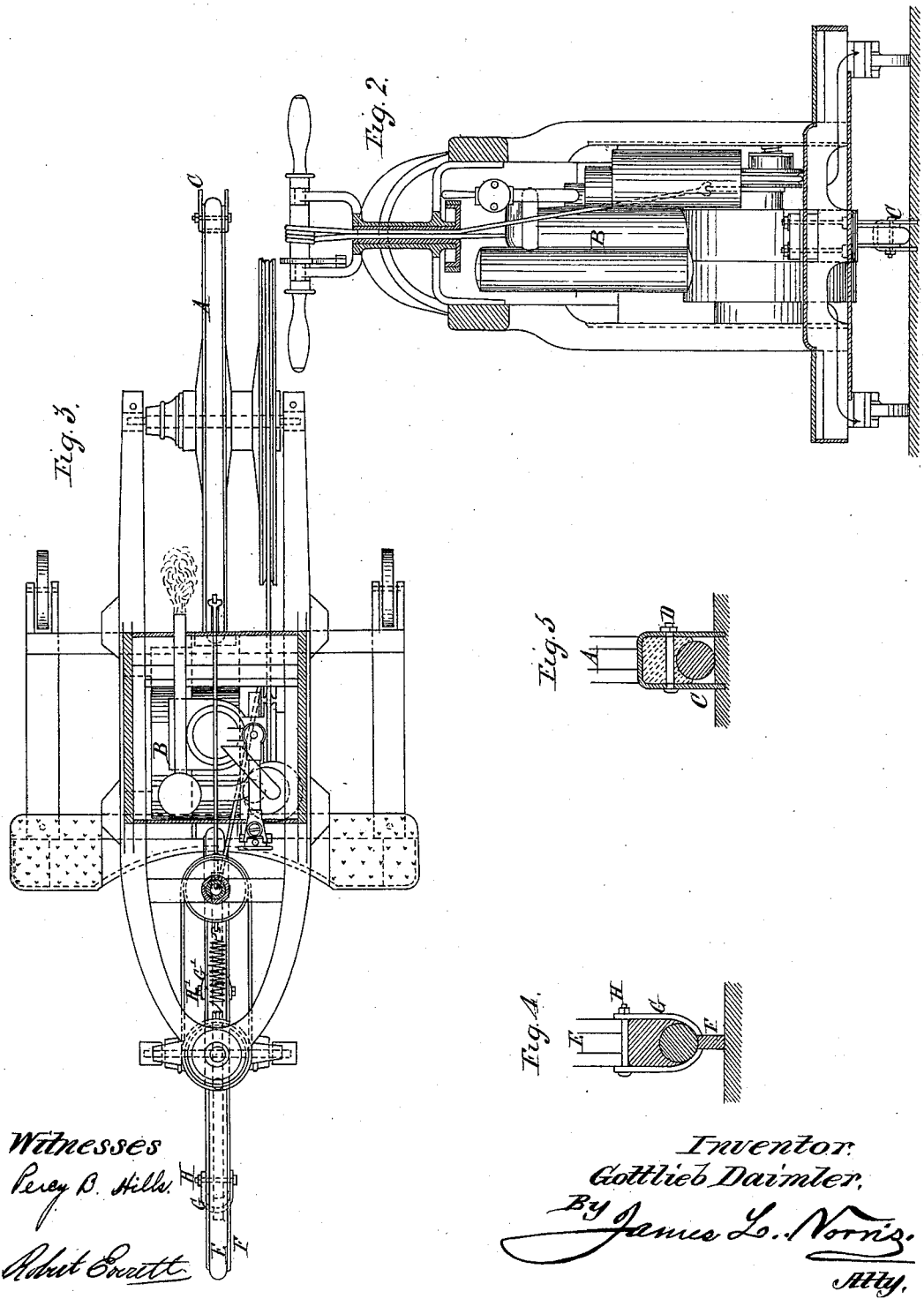
Witnesses
Percy B. Hills.
Robert Everett.
Inventor
Gottlieb Daimler,
By James L. Norris.
Atty.

UNITED STATES PATENT OFFICE.

GOTTLIEB DAIMLER, OF CANNSTADT, WÜRTEMBERG, GERMANY.

POWER-DRIVEN VEHICLE.

SPECIFICATION forming part of Letters Patent No. 347,160, dated August 10, 1886.

Application filed April 19, 1886. Serial No. 199,442. (No model.) Patented in England September 11, 1885, No. 10,786; in Belgium October 15, 1885, No. 70,293; in Italy December, 17, 1885, No. 18,955; in France December 21, 1885, No. 171,261; in Austria-Hungary February 18, 1886, No. 32,523 and No. 2,203, and in Spain March 26, 1886, No. 8,264.

*To all whom it may concern:*

Be it known that I, GOTTLIEB DAIMLER, a citizen of Würtemberg, residing at Cannstadt, in the Kingdom of Würtemberg, and Empire of Germany, have invented a new and useful Improvement in Vehicles Driven by a Gas or Petroleum Motor Engine, whereby they are rendered applicable as sledges, (for which application for patent has been made in England September 11, 1885, No. 10,786; in Belgium October 15, 1885, No. 70,293; in Italy December 17, 1885, No. 18,955; in France dated December 21, 1885, No. 171,261; in Austria-Hungary February 18, 1886, No. 32,523 and No. 2,203, and in Spain dated March 26, 1886, No. 8,264,) of which the following is a specification.

My invention has for its object to render a vehicle—such as a bicycle or tricycle propelled by a gas or petroleum motor engine—applicable as a sledge when required to run on ice or snow. For this purpose I combine with such vehicles devices as I will describe with reference to the accompanying drawings, in which I have shown my invention applied to the construction of bicycle described in my application for Letters Patent, No. 17,962.

Figure 1 shows a side elevation of the bicycle. Fig. 2 shows a cross-section. Fig. 3 shows a plan. Figs. 4 and 5 show enlarged cross-sections, respectively, on lines X X and Y Y, Fig. 1.

The wheel A, which is driven by the motor B, is provided with spikes C C, formed as looped pieces of metal that pass round the inner face of the wheel's felly, and are secured by a screw-bolt, D, passing through the felly. Thus in rotating with the wheel the spikes C penetrate into the ice or hard snow, and prevent the wheel from slipping. The front or steering wheel E, is provided with a sledge iron or skid, F, having two loops, G G', that embrace the felly of the wheel, and are secured by a screw-bolt, H H', passing through eyes in the loops on the inner side of the felly.

On removing the skid F and spikes C the vehicle can be used as an ordinary bicycle.

Having thus described the nature of my invention, and the best means I know for carrying the same into practical effect, I claim—

The combination, with a vehicle driven by a gas or petroleum motor engine, of spikes C, attached to the wheel or wheels driven by the motor, and of a skid or skids, F, attached to the front or steering wheel or wheels, the attachment of said spikes and skid being effected by loops and screw-bolts, so as to be readily attachable and removable.

In testimony whereof I have signed my name to this specification in the presence of two subscribing witnesses, this 2d day of April, A. D. 1886.

GOTTLIEB DAIMLER.

Witnesses:
 FRIEDRICH KÜBLER,
 WILH. MAYBACH.